United States Patent [19]

Survil et al.

[11] Patent Number: 4,926,704

[45] Date of Patent: May 22, 1990

[54] VALVE TEST PLUG

[75] Inventors: Robert J. Survil, Duncanville; Robert T. Weber, Dallas, both of Tex.

[73] Assignee: Flow Design, Inc., Dallas, Tex.

[21] Appl. No.: 335,891

[22] Filed: Apr. 10, 1989

[51] Int. Cl.$^5$ ................................................ G01L 7/00
[52] U.S. Cl. .................................................. 73/866.5
[58] Field of Search ............... 73/756, 863.81, 863.85, 73/863.86, 864.21, 864.74, 864.86, 864.87, 866.5; 374/148, 155, 208, 209, 210; 137/317, 320, 227, 228, 229, 223; 138/90

[56] References Cited

U.S. PATENT DOCUMENTS

| | | | |
|---|---|---|---|
| 3,217,733 | 11/1965 | Howard | 137/317 |
| 3,797,317 | 3/1974 | Peterson, Jr. | 137/317 |
| 3,930,413 | 1/1976 | Laird et al. | 73/863.85 |
| 4,297,891 | 11/1981 | Falcon | 73/756 |
| 4,817,450 | 4/1989 | Jachim | 73/866.5 |
| 4,834,720 | 5/1989 | Blinkhorn | 604/175 |

FOREIGN PATENT DOCUMENTS

1241203  8/1971  United Kingdom ................ 73/756

*Primary Examiner*—Robert Raevis
*Attorney, Agent, or Firm*—Baker, Mills & Glast

[57] ABSTRACT

A valve test plug for connection with a pressure vessel. The plug includes a hollow valve body and a resilient valve core. The valve core includes first and second core portions bonded in end-to-end relationship and has a slit extending therethrough. The first core portion is exposed directly to the pressure and is softer than the second core portion which engages the valve body to close the slit or to seal on the probe when the probe is extending through the slit. The softer first core portion maintains a seal with the valve body and urges the second core portion into sealing engagement with the valve body end to close the slit.

4 Claims, 1 Drawing Sheet

U.S. Patent
May 22, 1990
4,926,704
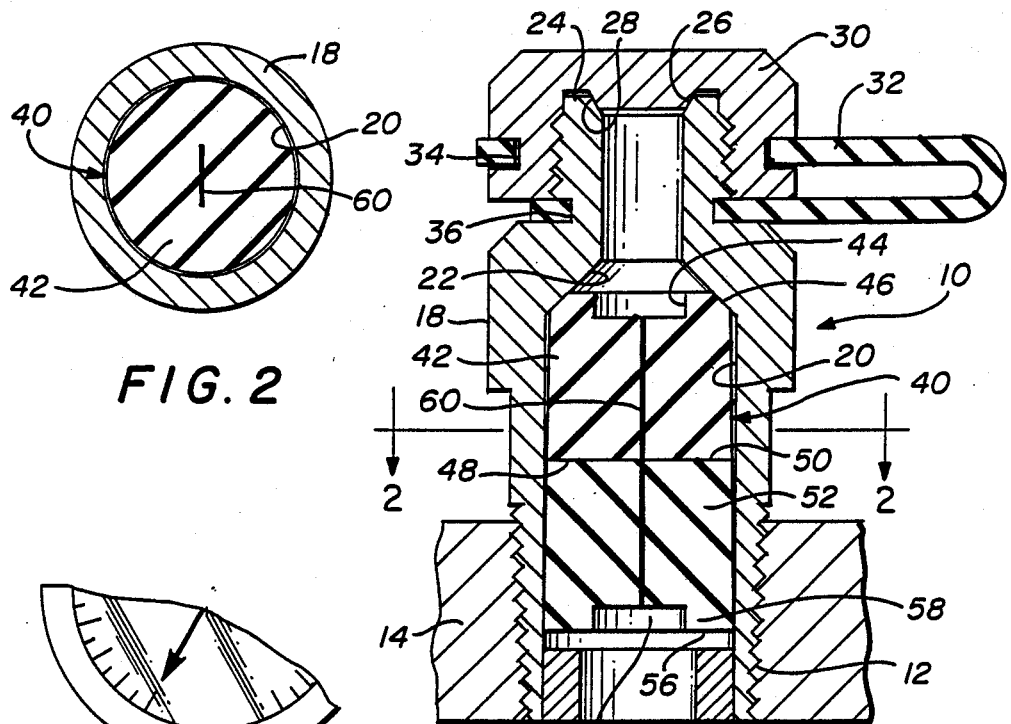
FIG. 2
FIG. 1
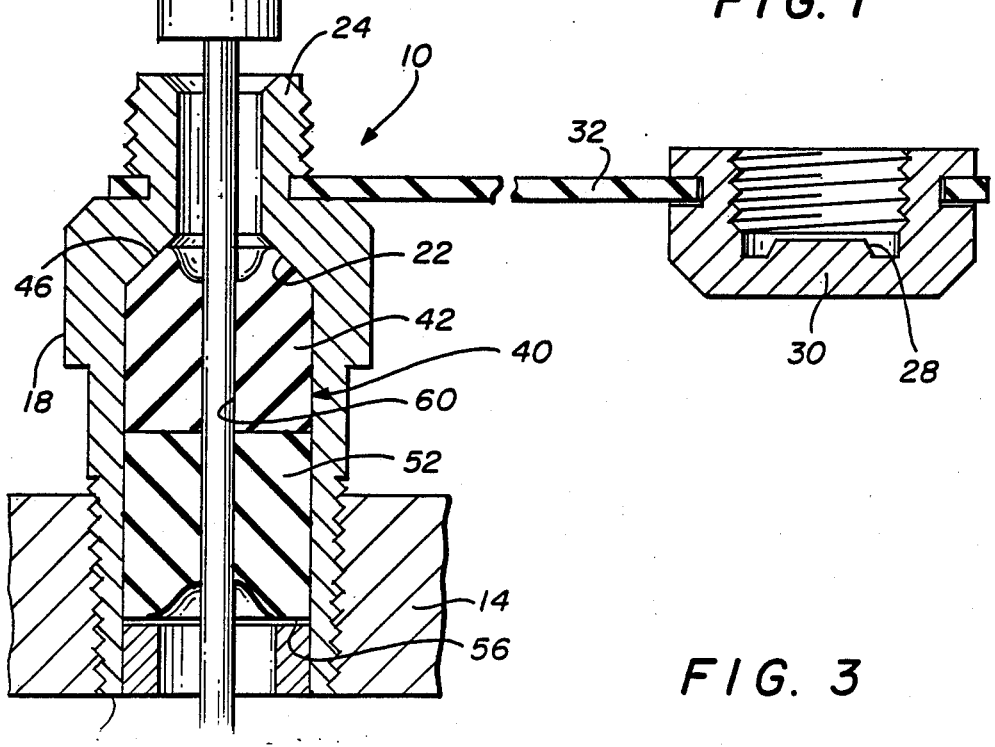
FIG. 3

VALVE TEST PLUG

FIELD OF THE INVENTION

This invention relates generally to apparatus for introducing a probe, such as a temperature or pressure probe into a pressure vessel from a lower pressure area for the purpose of determining the condition within the high pressure vessel. More particularly, but not by way of limitation, this invention relates to a valve test plug that is attached to the pressure vessel and has a core located therein that is constructed from resilient material through which the test probe can be inserted.

BACKGROUND OF THE INVENTION

Valves, having resilient cores, have been in use for many years for the purpose of permitting the introduction of probes from a low pressure areas into high pressure, areas within pressure vessels. For example, among the most notorious are those valves utilized for filling such items as footballs, basketballs, and volleyballs with air. Also, such valves are frequently used to insert a pressure test probe that indicates the pressure within the ball to determine whether or not it is properly inflated.

Other valve/test plugs are illustrated in U.S. Pat. No. 3,902,517 issued Sept. 2, 1975 to Richard Hastwell. That patent describes a valve core of resilient material that is located in the filler cap of a fuel tank wherein an inflating needle can be inserted therethrough to pressurize a fuel supply.

Another patent illustrating a resilient valve core is shown in U.S. Pat. Des. No. 252,701 issued Aug. 21, 1979 to Jerry L. Caldwell. The various figures of that design patent illustrate a resilient core for use in such valve test plugs and the like.

U.S. Pat. No. 3,797,317 issued Mar. 19, 1974 to Charles D. Peterson, Jr. discloses a split valve test plug that is intended for the same purposes as described in connection with this valve. As shown and described therein, the core of that valve consists of two separate members located in the body of the valve with each having a split therethrough for receiving a test probe. Stated another way, the valve of that patent utilizes two separate valve members, each of which seals on the probe when it is inserted therethrough. The lower valve closes first when the probe is being removed to aid in securely closing the upper or outer valve member. As described therein, the two valve members of the '317 patent are identically constructed. Also disclosed therein is a cap or cover that carries an internal gasket for sealing on the upper end of the valve body when the probe is removed to assure that no leakage occurs even if one of the two valve members should leak.

While the foregoing have worked satisfactorily, some problems have arisen. For example, the valve caps and the seal contained therein are loose and are frequently lost or damaged when the probe is inserted through the valve.

The seals in the caps have disintegrated due to screwing the caps onto the body too tightly with the result that the valve cores have been damaged or dislodged into the vessel when attempting to insert a test probe through the core. The result of the loss of a valve core entails the release of whatever pressure is in the vessel through the test plug.

In addition, the use of identical valve core members results in a compromise in the hardness of the valve core members. Such a compromise may result in extrusion or severe deformation of the core member exposed to the higher pressure if the core members are too soft. The compromise may result in severe leakage problems if the core members fail to seal properly on the probe because the members are too hard.

SUMMARY OF THE INVENTION

An object of this invention is to provide an improved test plug that obviates the foregoing disadvantages and provides a valve core that effectively seals either when the probe is inserted or when the probe is removed.

To accomplish the foregoing, this invention provides an improved test plug comprising a hollow valve body having a first end arranged for connection to a pressure vessel with the interior of the body exposed to the fluid pressure in the vessel and having a second end remote from the vessel. The body has an interior wall extending from a first end to a second end and has an interior shoulder adjacent to the second end. A resilient valve core having a truncated conical exterior is located in the interior of the body with a larger end on the core sealingly engaging the interior wall of the body. The core has a second end and a split sized to receive the test probe that extends through the second end. The first end of the core is exposed to fluid pressure in the vessel to urge the core toward the shoulder on the second end of the body forcing the core in tight sealing engagement with the body and closing the slit.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein:

FIG. 1 is a vertical, cross-sectional view of a valve test plug that is constructed in accordance with the invention;

FIG. 2 is a transverse, cross-sectional view taken generally along the line 2—2 in FIG. 1;

FIG. 3 is a vertical, cross-sectional view illustrating the improved test plug constructed in accordance with this invention with a test probe inserted therethrough.

DESCRIPTION OF THE ILLUSTRATED EMBODIMENT

Referring to the drawing and to FIGS. 1 and 2 in particular, shown therein and generally designated by the reference character 10 is a valve test plug that is constructed in accordance with the invention. As illustrated, the valve test plug 10 has an exterior thread 12 on end 16 thereof that is screwed into a mating thread in a wall of a pressure vessel 14. It will be understood that the end 16 of the body 18 of the valve test plug 10 is exposed to the high pressure fluid within the pressure vessel 14.

The valve body 18, in addition to the end 16, includes a hollow interior 20 that extends entirely therethrough. The interior 20 of the body 18 is provided with a tapered surface 22 adjacent to a second end 24 of the body 18. Extending through the second end 24 of the body 18 is a second conical or tapered surface 26 that is preferably ground to provide a sealing surface for a mating seal portion 28 that is located in the interior of a seal cap 30. The seal cap 30 is provided with an interior thread so that it can be screwed onto the end 24 of the valve body 18.

To prevent loss of the cap 30, a flexible retainer strap 32 encircles the cap 30 in a groove 34. The strap 32 also extends into and encircles the body 18 in a recess 36 that is located just below the exterior threads on the end 24 of the valve body 18 thus movably securing the cap 30 to the body 18.

Located within the valve body 18 is a resilient valve core that is generally designated by the reference character 40. As illustrated, the valve core 40 includes a first member 42 that is constructed from a resilient material having a hardness of between 60 and 80 durometer. Preferably, and for most applications, the member 42 should have a hardness of about 70 durometer. The member 42 is provided with a counter-bore 44 in the end thereof adjacent to the end 24 of the valve body 18. On the same end, the exterior of the core member 42 is provided with a tapered surface 46 that engages the conical surface 22 formed in the interior of the valve body 18.

The opposite end 48 of the member 42 is bonded to an end 50 on a second core member 52 which is also part of the valve core 40. The second core member 52 is also constructed from a resilient material, but one that is softer than the core member 42. The core member 52 should be selected to have a hardness of between 25 and 45 durometer and, preferably, has a durometer of about 35. The type of resilient material selected for the core members 42 and 52 will depend on the type of liquids to which they are exposed.

The end of the second core member 52 located adjacent to the interior of the pressure vessel 14, is provided with a counter-bore 54 that provides an exterior and axially extending circumferential flange 56 thereon. The flange 56 is sufficiently flexible to respond to the pressure to force the exterior surface 58 on the valve core member 52 into tight sealing engagement with the interior wall of the valve body 18.

Extending through the valve core 40 from the counter-bore 44 to the counter-bore 54 is a slit 60. Although the slit 60 extends through the entire length of the valve core 40, it only extends partially across the valve core 40 as is clearly shown in FIG. 2. The purpose of the slit 60 is to permit a test probe 62 (see FIG. 3) to pass through the valve test plug 10 into the interior of the pressure vessel 16.

The core member 42 is preferably of the harder material, but one that is soft enough so that a seal is easily obtained with the valve body 18 and one that permits the slit 60 to close easily. The use of the harder material also permits a probe 62 to be repeatedly inserted into the slit 60 without damage to the valve core member 42. The core member 52 is preferably of a softer material that will withstand the pressure force and yet one that maintains a seal with the valve body 18 through the action of the pressure responsive flange 56.

Although the core 40 has been illustrated as being constructed from two members 42 and 52, it performs as a unitary member since the members 42 and 52 are permanently bonded together. The ideal valve core would have the hardness varying from one end of the valve core to the other.

In the preferred form of the valve core 40, the exterior 58 thereon is tapered with the largest diameter being adjacent to the flange 56 and the smaller diameter being adjacent to the conical surface 46. Such an arrangement is preferred so that a seal will be formed adjacent to the flange 56 and pressure in the pressure vessel will urge the surface 46 into tight sealing engagement with the surface 22 in the interior of the valve body 18 to retain the slit 60 tightly closed and prevent flow from the interior of the pressure vessel 16 through the valve test plug 10.

Should a small leak occur through the core 40 of the test plug 10, the cap 30 is screwed thereon as illustrated in FIG. 1 with the surfaces 26 and 28 in sealing engagement thus providing a back-up to prevent any leakage from the vessel 14.

Near the end 16 of the valve body 18, there is provided a valve core retainer 61 that is forced or pressed into the valve body 18. The retainer 61 is pressed into the valve body 18 to a position spaced from the flange 56 of the valve core member 52 in the relaxed condition of the core 40, but where it would be engageable therewith should the valve core member 52 move downwardly. The space provided is necessary to permit deformation of the valve core 40 when the probe 62 is inserted therein.

OPERATION OF THE ILLUSTRATED EMBODIMENT

FIG. 3 illustrates the test plug 10 with the test probe 62 inserted therein for determining temperature, pressure or other conditions within the pressure vessel 14. As shown, the cap 30 has been removed from the valve test plug 10. It will be noted that the cap 30 cannot be lost due to the retainer strap 32 which permits unscrewing of the cap 30 from the body 18, but prevents the separation of the valve cap 30 from the body 18.

After removal of the cap 30, the probe 62 is introduced into the valve body 18 and inserted through the slit 60 until the end of the probe 62 enters the pressure vessel 14. Since the resilient materials forming the valve core 40 are essentially non-compressible, the core members 42 and 52 will be deformed or distorted slightly as illustrated in FIG. 3.

Pressure from within the pressure vessel 14 acts on the flange 56 to force the valve core 40 into tight sealing engagement with the wall of the body 18 while at the same time driving the valve core member 42 upwardly forcing the surface 46 thereon into tight sealing engagement with the conical surface 22 in the valve body 18. At the same time, such tapered surfaces cause the resilient material forming the valve core member 42 to be forced inwardly into tight sealing engagement with the exterior of the probe 62.

As the probe 62 is removed, the relatively soft valve core member 52 responds to pressure in the vessel 14 to close the slit 60 behind the probe 62. The force exerted by the pressure in the vessel 10 urges the core member 52 toward the core member 42 as the probe 62 is withdrawn, forcing the surface 46 into tighter engagement with the surface 22 in the body 18. As a result, the harder material of the core member 42 will close the slit 60 and form a seal with the body 18. The use of the harder material is also effective to prevent extrusion of the seals past the surface 22 in the body 18.

As can be appreciated from the foregoing detailed description, the valve test plug 10 described permits the insertion of a probe therethrough from a low pressure area into a relatively higher pressure to determine the internal conditions o..f a pressure vessel or perhaps to provide a means of sampling the contents of the interior. Also, the arrangement is such that the valve core is responsive to pressure to close the slit provided for the probe when the probe is not inserted therein to prevent loss of fluid from the pressure vessel and, further, to effectively seal around the probe when the probe is inserted therein. The valve cap eliminates the need for an extra seal member within the cap due to the presence of the sealing surface formed in the cap itself. This avoids the possible loss of the seal member and subsequent inability to prevent leakage should a valve core leak occur.

Having described but a single embodiment of the invention, it will be understood that many changes and modifications can be made thereto without departing from the spirit or scope of the invention.

What is claimed is:

1. An improved valve test plug for use with a slender, elongated test probe comprising:

a hollow valve body having a first end arranged for connection to a pressure vessel with the interior of the body exposed to the fluid pressure in the vessel and having a second end remote from said vessel, said body having an interior shoulder adjacent to said second end and a tapered interior surface on said shoulder;

a resilient valve core located in the interior of said body, a first end on said engageable with said shoulder in said body, said core having a second end and a slit sized to receive the test probe extending through first and second ends of said core, the first end of said core being exposed to fluid pressure in said vessel to force the second end of said core into engagement with said tapered interior surface whereby said core is biased toward a smaller diameter forcing said slit closed; and said resilient valve core also includes a first core portion including the first end of said core, and a second core portion including the second end of said core, said second core portion located in tandem relationship to said first core portion and being harder than said first core portion.

2. The test plug of claim 1 wherein said first and second core portions comprise separate core members permanently bonded in end-to-end relationship.

3. The test plug of claim 1 wherein:

said first core portion has a hardness of between 25 and 45 durometer; and said second core portion has a hardness of between 60 and 80 durometer.

4. The test plug of claim 3 wherein:

said first core portion has a hardness of about 35 durometer; and said second core portion has a hardness of about ζdurometer.

* * * * *

UNITED STATES PATENT AND TRADEMARK OFFICE
CERTIFICATE OF CORRECTION

PATENT NO. : 4,926,704

DATED : May 22, 1990

INVENTOR(S) : Robert J. Survil and Robert T. Weber

It is certified that error appears in the above-identified patent and that said Letters Patent is hereby corrected as shown below:

Column 4, line 63, change "o..f" to --of--.

IN THE CLAIMS

Claim 1, line 23, after "said" first instance, insert --core--.

Claim 4, line 24, before "durometer" insert --70--.

Signed and Sealed this

Seventeenth Day of September, 1991

Attest:

HARRY F. MANBECK, JR.

Attesting Officer      Commissioner of Patents and Trademarks